April 14, 1925.
O. L. HUTCHCROFT
1,533,421
MOTOR VEHICLE CHAIN TIGHTENER
Filed March 21, 1924
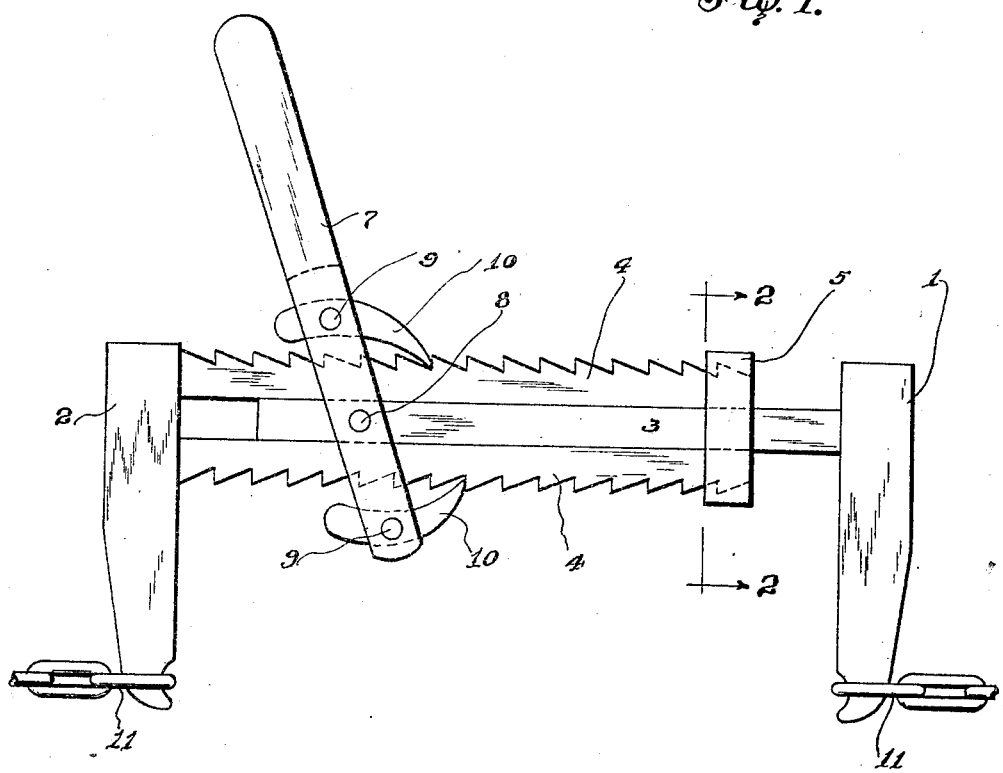
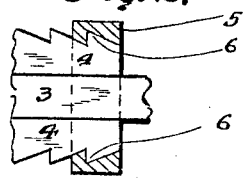
Inventor
O. L. Hutchcroft
By E. E. Vrooman Heo.,
His Attorneys Patented Apr. 14, 1925.

1,533,421

UNITED STATES PATENT OFFICE.

ORIS L. HUTCHCROFT, OF MEDIAPOLIS, IOWA.

MOTOR-VEHICLE CHAIN TIGHTENER.

Application filed March 21, 1924. Serial No. 700,851.

*To all whom it may concern:*

Be it known that I, ORIS L. HUTCHCROFT, a citizen of the United States, residing at Mediapolis, in the county of Des Moines and State of Iowa, have invented certain new and useful Improvements in Motor-Vehicle Chain Tighteners, of which the following is a specification, reference being had therein to the accompanying drawings.

This invention relates to a motor vehicle chain tightener, and the object of the invention is the construction of a simple and efficient chain tightener device which comprises a minimum number of parts and which is simple and efficient in operation.

Another object of the invention is the construction of a chain tightening device that can be operated to tighten the chain by the operator using one hand to manipulate the jaws of the device, for accomplishing the desired purpose.

With these and other objects in view, my invention comprises certain novel combinations, constructions and arrangements of parts as will be hereinafter described, illustrated in the accompanying drawings, and more particularly pointed out in the appended claim.

In the drawings:

Figure 1 is a view, in side elevation, of a chain tightening device constructed in accordance with the present invention.

Figure 2 is a fragmentary sectional view showing the manner of holding the jaws in sliding engagement with each other.

Referring to the drawings by numerals, 1 comprises a primary jaw, and 2 the auxiliary jaw of my device, the primary jaw being provided with a straight bar 3 that is slidably mounted between parallel rack bars 4; these rack bars 4 are preferably integral at their outer ends with the auxiliary jaw 2. On the outer end of rack bars 4 is positioned a collar 5, which acts as a "yoke" surrounding both the rack bars 4 and the central bar 3 with the teeth 6, of the rack bars 4 embedded or placed into the body of the collar 5 as clearly shown in Fig. 2, whereby the collar is permanently, and durably secured in position upon the bars. An operating handle 7 is pivotally mounted, at 8, upon the outer end of the central bar 3. Pivotally mounted, at 9, upon the handle 7, are pawls or dogs 10 which engage the teeth of the rack bars 4.

In operation the ends 11 of the chain are hooked over the outer ends of the jaws 1 and 2 (Fig. 1) and then the operator grasps the outer end of handle 7, creating a reciprocating movement which causes the dogs 10 to ride successively over the rack bars, one acting alternatively as a take-up device, and the other as a check device; when one dog is pressing upon a rack bar to cause it to slide upon central bar 3, to bring the jaws closer together, the other dog will act to lock the rack bars from a backward or outward sliding movement, thereby preventing any lost movement. It will be obvious that upon the operator lifting the outer ends of both dogs in engagement with the rack bars, that the jaws of the device may be spread apart prior to placing the ends 11 of the chain upon the same.

If it is desired springs of any ordinary structure may be placed upon the handle and pressed downwardly upon the inner ends of the dogs for more positively holding the dogs in an operable position with respect to the rack bars.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claim.

What I claim is:

As a new article of manufacture, a chain tightener comprising a primary jaw and an auxiliary jaw, parallel bars provided with teeth on their outer edges fastened at their outer ends to said auxiliary jaw, a straight bar between said parallel bars and fastened at its outer end to said primary jaw, a narrow collar around the straight bar and the inner ends of said parallel bars only, a tooth at the extreme inner end of each of said parallel bars extending into the body of said collar, a handle on said straight bar, and dogs on said handle and engaging some of the teeth of said parallel bars, substantially as shown and described.

In testimony whereof I hereunto affix my signature.

ORIS L. HUTCHCROFT.